United States Patent
Mavridis et al.

(10) Patent No.: US 10,501,613 B2
(45) Date of Patent: Dec. 10, 2019

(54) LOW-SAG POLYETHYLENE PIPES AND METHODS THEREOF

(71) Applicant: EQUISTAR CHEMICALS, LP, Houston, TX (US)

(72) Inventors: Harilaos Mavridis, Lebanon, OH (US); Chun D. Lee, Cincinnati, OH (US); Steven W. Horwatt, West Chester, OH (US); Sameer D. Mehta, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 282 days.

(21) Appl. No.: 15/400,562

(22) Filed: Jan. 6, 2017

(65) Prior Publication Data

US 2018/0030252 A1 Feb. 1, 2018

Related U.S. Application Data

(60) Provisional application No. 62/368,847, filed on Jul. 29, 2016.

(51) Int. Cl.
| | | |
|---|---|---|
| *C08L 23/06* | (2006.01) | |
| *B29C 48/09* | (2019.01) | |
| *B29C 48/00* | (2019.01) | |
| *C08L 23/14* | (2006.01) | |
| *F16L 9/127* | (2006.01) | |
| *B29K 23/00* | (2006.01) | |
| *B29L 23/00* | (2006.01) | |

(52) U.S. Cl.
CPC ............ *C08L 23/06* (2013.01); *B29C 48/022* (2019.02); *B29C 48/09* (2019.02); *C08L 23/14* (2013.01); *F16L 9/127* (2013.01); *B29K 2023/065* (2013.01); *B29L 2023/22* (2013.01); *C08L 2203/18* (2013.01); *C08L 2205/02* (2013.01); *C08L 2207/062* (2013.01)

(58) Field of Classification Search
CPC ...... C08L 23/06; C08L 23/14; C08L 2203/18; C08L 2205/02; C08L 2207/062; C08L 2205/025; B29C 48/08; B29C 48/022; F16L 9/127; F16L 9/12; B29L 2023/22; B29K 2023/065; B29K 2023/0675; B29K 2023/0691

See application file for complete search history.

(56) References Cited

FOREIGN PATENT DOCUMENTS

| WO | 2008083276 A1 | 7/2008 |
| WO | 2013101767 A2 | 7/2013 |
| WO | 2016005044 A1 | 1/2016 |

OTHER PUBLICATIONS

International Search Report and Written Opinon dated Oct. 12, 2017 (Oct. 12, 2017) for Corresponding PCT/US2017/044179.

*Primary Examiner* — Michael C Miggins

(57) ABSTRACT

The present disclosure relates to pipes comprising bimodal high molecular weight high density polyethylene which has been extruded in the presence of one or more organic peroxides that are present in an amount ranging from 30 ppm to 200 ppm. The pipe has an improved long-term hydrostatic strength. Also provided are methods for preparing pipes having these characteristics.

10 Claims, No Drawings

LOW-SAG POLYETHYLENE PIPES AND METHODS THEREOF

CROSS-REFERENCE TO RELATED APPLICATIONS

This application claims the benefit of and the priority of U.S. Application No. 62/368,847, filed on Jul. 29, 2016, the disclosure of which is incorporated herein by reference in full.

STATEMENT REGARDING FEDERALLY SPONSORED RESEARCH OR DEVELOPMENT

Not applicable.

FIELD OF THE INVENTION

Embodiments of the present disclosure relate to polyolefin pipes, including polymeric resin compositions that are useful in improving the processability and production of high density polyethylene pipes.

BACKGROUND OF THE INVENTION

This section introduces information that may be related to or provide context for some aspects of the techniques described herein and/or claimed below. This information is background facilitating a better understanding of that which is disclosed herein. Such background may include a discussion of "related" art. That such art is related in no way implies that it is also "prior" art. The related art may or may not be prior art. The discussion is to be read in this light, and not as admissions of prior art.

Pipes formed from polyethylene, and polyolefins such as polyethylene have been used in commercial plastics based on their outstanding performance and cost characteristics. High density polyethylene has been used in commercial applications such as pipe production due to its chemical and physical resilience, e.g., its impact resistance and its ability to withstand thermal extremes. The production and value of high density polyethylene pipe may be dependent on factors which include the extrudability of the polymeric resin and the resistance of the resulting pipe to sagging, which may occur during melt extrusion of thick-walled pipe, and which leads to unacceptable pipe wall thickness variation around the pipe circumference.

SUMMARY OF THE INVENTION

The present disclosure provides for a polyolefin composition which can be used to prepare improved plastic pipe such as pipe formed from high density polyethylene. In some embodiments, the polyolefin compound has been extruded with one or more peroxide compounds, which are believed to increase the resistance of pipe formed from such polyolefin to sagging while maintaining the extrudability associated with high density polyethylene resins.

Provided herein are compositions for the production of thick high density polyethylene pipe having an improved combination of processability and properties.

Embodiments of the present technology include pipe(s) comprising bimodal high molecular weight high density polyethylene which has been extruded in the presence of an organic peroxide. The organic peroxide may have been present in an amount ranging from about 30 ppm to about 200 ppm. The pipe may have had an improved long-term hydrostatic strength (LTHS). Alternatively, provided herein are pipes comprising bimodal high molecular weight high density polyethylene and having a sag value of about 20 or less, a PENT result of about 500 hours or more, and a Charpy impact energy of about 10 $kJ/m^2$ or more. Methods for preparing pipe with these characteristics are also provided.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the detailed description is illustrative in nature and not restrictive.

DETAILED DESCRIPTION OF THE INVENTION

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The embodiments illustratively disclosed herein may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations disclosed herein is to be understood to set forth every number and range encompassed within the broader range of values. It is to be noted that the terms "range" and "ranging" as used herein generally refer to a value within a specified range and encompasses all values within that entire specified range.

As used throughout this document, the term "improved processability" may mean that extrudability (as measured by extruder pressure and amps, or shear viscosity) is improved or stays the same as compared to a similar non-improved resin, and/or a better sag resistance as compared to a similar non-improved resin.

Furthermore, various modifications may be made within the scope of the invention as herein intended, and embodiments of the invention may include combinations of features other than those expressly claimed.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

This disclosure provides pipe(s) comprising extruded bimodal high density polyethylene in which the pipe has improved physical properties compared to other high density polyethylene pipe. The extruded bimodal high density polyethylene may be useful for forming pipes having thicknesses in the range of about 3.0 inches (7.6 cm) to over 4 inches (10.2 cm), and external diameters ranging from about 1 inch to about 6 feet or greater.

In one of its embodiments, this disclosure provides a pipe comprising bimodal high molecular weight high density polyethylene which has been extruded within the range of about 30 ppm to about 200 ppm of an organic peroxide, the pipe having a long-term hydrostatic strength $t_F/t_R$ ratio of about 1.5 or greater when determined at 23° C. and 12 MPa and/or at 23° C. and 11.5 MPa.

Qualitative features of pipes formed from the extruded bimodal high molecular weight high density polyethylene in this disclosure may include that the pipe exhibits some surface roughness, but the surface is smooth enough for many pipe applications. The surface roughness may be lowest when the bimodal high molecular weight high density polyethylene has been extruded with about 60 ppm of an organic peroxide, such as without limitation 2,5-dimethyl-2,5-di(tert-butylperoxy)hexane.

As used throughout this document, the phrase "high density polyethylene" may refer to bimodal high molecular weight high density polyethylene unless otherwise indicated. The acronym HDPE also refers to bimodal high molecular weight high density polyethylene as used throughout this document. Throughout this document, as applicable, the terms "extruded bimodal high molecular weight high density polyethylene" and "extruded HDPE" refer to bimodal high molecular weight high density polyethylene that has been extruded with an organic peroxide.

The phrase "organic peroxide" as used throughout this document may refer to the organic monoperoxides or organic diperoxides as described below. Throughout this document, the organic monoperoxides or organic diperoxides are sometimes referred to as "organic monoperoxides or diperoxides" or as "organic monoperoxides and diperoxides".

The bimodal high molecular weight high density polyethylene used in the practice of this disclosure may have a pipe material designation code of PE 3608 or, PE 4710. The bimodal high molecular weight high density polyethylene used in the practice of this disclosure may also have a pipe material designation code PE 100. Alternatively, the HDPE may be prepared as described in U.S. Pat. No. 9,249,286, the disclosure of which is incorporated herein by reference; an alternative commercially available HDPE is Alathon® L4904, a product of LyondellBasell (Houston, Tex.). Alathon® L4904 has a melt flow rate (190° C./2.16 kg) of about 0.04 g/10 min., an HLMI (190° C./2.16 kg) of about 7.0 g/min., a density of about 0.949 g/cm³ (23° C.), a flexural modulus of about 146,000 psi (1007 MPa; 2% secant), a tensile stress at break of about 5100 psi, a tensile stress at yield of about 3500 psi, and a tensile elongation at break of about 800%.

The organic peroxide used to form the extruded bimodal high molecular weight high density polyethylene may be one or more organic monoperoxides and/or organic diperoxides. These organic monoperoxides and diperoxides may have a half-life of 1 hour at a temperature in the range of about 125° C. to about 145° C., alternatively in the range of about 130° C. to about 140° C., alternatively in the range of about 132° C. to about 136° C. Further alternatives include organic peroxides having a half-life of 0.1 hour at a temperature in the range of about 145° C. to 165° C., or in the range of about 150° C. to about 160° C., or in the range of about 154° C. to about 158° C. The organic peroxide may have a molecular weight in the range of about 175 g/mol to about 375 g/mol, alternatively in the range of about 200 g/mol to about 350 g/mol. Mixtures of two or more peroxides can be used if desired. Suitable organic peroxides include, but are not limited to, dicumyl peroxide (CAS® registry number 80-43-3), di(tert-butylperoxyisopropyl)benzene(s) (CAS® registry number 25155-25-3), 2,5-dimethyl-2,5-di(tert-butylperoxy)hexane (CAS® registry number 78-63-7), tert-butyl cumyl peroxide (CAS® registry number 3457-61-2), and 2,5-dimethyl-2,5-di(tert-butylperoxy)hexyne (CAS® registry number 1068-27-5), and mixtures thereof.

The organic peroxide may be used in an amount ranging from about 30 to about 200 ppm, alternatively in the range of about 40 to about 150 ppm, alternatively in the range of about 45 ppm to about 125 ppm, and alternatively in the range of about 45 to about 80 ppm when extruding the bimodal high density polyethylene. The one or more organic peroxide(s) can be added either via a masterbatch or by "salt and pepper" addition.

A porous polypropylene random copolymer may be present in the extruded bimodal high molecular weight high density polyethylene. The porous polypropylene random copolymer may be present in an amount in the range of about 200 to about 1000 ppm, alternatively in the range of about 250 to about 750 ppm, alternatively in the range of about 250 ppm to about 650 ppm, and alternatively in the range of about 250 to about 400 ppm in the extruded bimodal high density polyethylene.

The extruded bimodal high molecular weight high density polyethylene may have a density in the range of about 0.9460 g/cm³ to about 0.9520 g/cm³, alternatively in the range of about 0.9470 g/cm³ to about 0.9510 g/cm³, and alternatively in the range of about 0.9480 g/cm³ to about 0.9500 g/cm³.

The amount of $C_4$ species present in the HDPE may affect the density of the extruded HDPE. In the practice of this disclosure, the $C_4$ species may be in the range of about 1.0 wt % to about 2.0 wt % of the HDPE, alternatively in the range of about 1.1 wt % to about 2.0 wt % of the HDPE, and alternatively in the range of about 1.2 wt % to about 2.0 wt % of the HDPE.

Another way of quantifying the $C_4$ species may be via the amount in the $C_2$ flow. The $C_4$ species may be in the range of about 1.2 wt % to about 2.6 wt % in the $C_2$ flow, alternatively in the range of about 1.4 wt % to about 2.5 wt % in the $C_2$ flow, and alternatively in the range of about 1.5 wt % to about 2.4 wt % in the $C_2$ flow.

Another property of the extruded bimodal high molecular weight high density polyethylene may be its melt index, measured as the high load melt index (HLMI). The HLMI of the extruded HDPE may be in the range of about 5 dg/min to about 10 dg/min, alternatively in the range of about 6 dg/min to about 9 dg/min, alternatively in the range of about 6 dg/min to about 8.5 dg/min, and alternatively in the range of about 6 dg/min to about 8 dg/min.

Long-term hydrostatic strength may be determined by the test set forth in ASTM D2387. Pipes formed from the extruded bimodal high molecular weight high density polyethylene in this disclosure may have an improved long-term hydrostatic strength (LTHS), also called "pipe creep." The experimentally determined LTHS values reported in this document were measured according to ASTM D2837 on 1-inch (2.54 cm) DR11 pipes extruded from a given resin in admixture with 7 wt % carbon black masterbatch (Modern Dispersions, Inc., PE 535-42). The addition of the carbon black masterbatch was carried out via tumble blending the components (resin and carbon black masterbatch) and then adding the components into the feed hopper of the pipe extruder.

In embodiments of this disclosure, an improved LTHS may be defined as a pipe having a $t_F/t_R$ ratio of about 1.5 or greater, when the LTHS is determined at 23° C. and 12 MPa (1740 psi) and/or a $t_F/t_R$ ratio of about 1.5 or greater, when the LTHS is determined at 23° C. and 11.5 MPa (1668 psi). Alternatively, the pipe may have a $t_F/t_R$ ratio of about 1.5 or greater at both conditions. Alternatively, the LTHS $t_F/t_R$ ratio may be about 2.0 or greater when determined at 23° C. and 12 MPa and/r 11.5 MPa; alternatively, the LTHS $t_F/t_R$ ratio may be about 2.5 or greater when determined at 23° C. and 12 MPa and/or 11.5 MPa. These $t_F/t_R$ ratios are sometimes referred to as "long term hydrostatic strength $t_F/t_R$ ratios", "LTHS $t_F/t_R$ ratios", or "LTHS ratios".

The $t_F/t_R$ ratios are determined by measuring the LTHS of the pipe and of a comparative pipe formed from HDPE similar in all respects, except that the comparative pipe has not been extruded with an organic peroxide, performing the measurements under the same conditions. The LTHS $t_F/t_R$ ratio may be calculated by dividing the time-to-failure in hours of the peroxide-containing pipe ($t_F$) by the time-to-failure in hours of the comparative pipe ($t_R$).

Another way to obtain the LTHS $t_F/t_R$ ratio is to measure the time-to-failure in hours of the peroxide-containing pipe and to calculate the $t_R$ value and the $t_F/t_R$ ratio according to Equation (1) for determinations at 12 MPa and according to Equation (2) for determinations at 11.5 MPa as follows.

$$\text{LTHS Ratio (at 12 MPa)}=t_F/t_R \quad (1)$$

where:
$t_F$=measured LTHS time-to-failure in hours at 23° C. and 12 MPa hoop stress, and
$t_R$=100 hours×[1+(density−0.947)×1340]

$$\text{LTHS Ratio at (11.5 MPa)}=t_F/t_R \quad (2)$$

where:
$t_F$=measured LTHS time-to-failure in hours at 23° C. and 11.5 MPa hoop stress, and
$t_R$=560 hours×[1+(density−0.947)×1340]

In Equations (1) and (2), the 0.947 value is the density of a comparative HDPE pipe that does not contain the peroxide. The value of 100 in Equation (1) is the time-to-failure in hours of this comparative HDPE pipe at 12 MPa; similarly, the value of 560 in Equation (2) is the time-to-failure in hours of this comparative HDPE pipe at 11.5 MPa. In Equations (1) and (2), the 1340 value has units of inverse density, and is a density difference factor that accounts for the increase in time-to-failure of the comparative HDPE pipe as density increases.

In pipes formed from the extruded bimodal high molecular weight high density polyethylene in this disclosure, the sag value may be about 20 or less, and alternatively about 15 or less. Sag values may be defined as $1/10^{th}$ of a percent of creep strain, and may be determined in a rotational parallel plate rheometer with a shear stress of 300 Pa for 5200 seconds at 230° C. Lower sag values may indicate a more uniform pipe thickness.

The resistance of polyethylene materials to slow crack growth may be measured by the Pennsylvania Notch Test (PENT), as set forth in ASTM F1473. PENT results in this document were obtained at 80° C. and 2.4 MPa. A PENT result of 500 hours is the minimum value required for certain pipe applications. Pipes formed from the extruded bimodal high molecular weight high density polyethylene in this disclosure may have a PENT result of about 600 hours or more, alternatively about 700 hours or more, alternatively about 800 hours or more. In various embodiments of this disclosure, pipes formed from the extruded HDPE may have a PENT result of about 1000 hours or more, twice the minimum value of 500 hours required for certain pipe applications. Results of the PENT are referred to herein as "PENT results," or sometimes simply as "PENT".

The experimentally determined PENT values reported in this document were measured according to ASTM F1473 on specimens prepared from a given resin in admixture with 7 wt % carbon black masterbatch (Modern Dispersions, Inc., PE 535-42). The addition of the carbon black masterbatch was carried out via melt blending of the components (resin and carbon black masterbatch) in a two-roll mill.

In some embodiments, the PENT may be about 500 hours or more, and alternatively about 1000 hours or more.

An alternate method for determining the crack resistance of polyethylene pipe is the Full Notch Creep Test (FNCT). This test is conducted at a specified stress and temperature, and the time to failure is measured. Typical procedures to determine the crack resistance via the FNCT are in accordance with ISO 16770 and ASTM D5397.

Pipes formed from the extruded bimodal high molecular weight high density polyethylene in this disclosure may have a rapid crack propagation (RCP), measured as the Charpy impact energy at 0° C., of about 10 $kJ/m^2$ or more, alternatively about 11 $kJ/m^2$ or more. The Charpy impact energy is determined as set forth in ASTM F2231.

In some embodiments of this disclosure, pipes comprising extruded HDPE may have a density in the range of about 0.9460 $g/cm^3$ to about 0.9520 $g/cm^3$; a sag value of about 20 or less; a PENT result of about 600 hours or more; and/or a Charpy impact energy of about 10 $kJ/m^2$ or more. Alternatively, pipes of the present disclosure may have at least two of these properties; alternatively, pipes of the present disclosure may have three of these properties; alternatively, pipes of the present disclosure may have all of these properties. In various embodiments, pipes of the present disclosure also may have long-term hydrostatic strength $t_F/t_R$ ratio of about 2.0 or greater when determined at 23° C. and 12 MPa and/or at 23° C. and 11.5 MPa, the extruded HDPE may contain a polypropylene random copolymer, and the organic peroxide may have been used in an amount in the range of about 40 ppm to about 150 ppm.

In other embodiments of this disclosure, pipes comprising extruded HDPE may have a density in the range of about 0.9470 $g/cm^3$ to about 0.9510 $g/cm^3$; a sag value of about 15 or less; a PENT result of about 1000 hours or more; and/or a Charpy impact energy of about 11 $kJ/m^2$ or more. Alternatively, pipes of the present disclosure may have at least two of these properties; alternatively, pipes of the present disclosure may have three of these properties; alternatively, pipes of the present disclosure may have has all of these properties. In various embodiments, pipes of the present disclosure may have a long-term hydrostatic strength $t_F/t_R$ ratio of about 2.0 or greater when determined at 23° C. and 12 MPa and/or at 23° C. and 11.5 MPa, the extruded HDPE may contain a polypropylene random copolymer, and the organic peroxide may have been used in an amount in the range of about 45 ppm to about 125 ppm.

In the present disclosure, Applicants believe that as the amount of the organic peroxide used in the extrusion of the bimodal high molecular weight high density polyethylene increases, the sag value of the pipe may decrease. Applicants further believe that as the amount of organic peroxide used in the extrusion increases, the PENT (slow growth crack resistance) may decrease, which is not desired. Thus, the amount of the organic peroxide may be selected to balance these effects.

The PENT may also be influenced by other factors. These factors may include the density and the melt index (HLMI) of the extruded bimodal high molecular weight high density polyethylene. PENT may decrease with increasing density, and PENT may also decrease with increasing HLMI.

The LTHS may increase as the density of the extruded HDPE increases. Applicants believe that this effect may be desirable, but, because PENT decreases as density increases, the extruded HDPE density may be selected to balance these effects.

The amounts of peroxide, and (when present) porous polypropylene random copolymer, may be set at the time of extrusion. Some of the properties of the extruded HDPE may be influenced by the extrusion conditions.

Another embodiment of this disclosure is a method of forming at least a portion of a pipe comprising bimodal high molecular weight high density polyethylene that has been extruded with an organic peroxide. The method may comprise extruding bimodal high molecular weight high density polyethylene within the range of about 30 ppm to about 200 ppm of an organic peroxide, to form extruded bimodal high molecular weight high density polyethylene, and forming at least a portion of a pipe from the extruded bimodal high molecular weight high density polyethylene, where the portion of the pipe has a long-term hydrostatic strength $t_F/t_R$ ratio of about 1.5 or greater when determined at 23° C. and 12 MPa and/or at 23° C. and 11.5 MPa. The extrusion to form pipe can be conducted using conventional polyethylene pipe extrusion equipment.

In the extrusion method, the bimodal high molecular weight high density polyethylene may be mixed with the organic peroxide before, during, and/or after melting the HDPE. The HDPE/peroxide mixture may be extruded, and the extruded material may be formed into pipe. The extrusion can be performed as the last step in a preparation of HDPE, such as in the finishing extruder, or as a separate extrusion of already-prepared HDPE.

A porous polypropylene random copolymer may be included in the extrusion mixture with the bimodal high molecular weight high density polyethylene and the organic peroxide. One such commercially available porous random copolymer is sold under the name Hifax® CA 7153 S, and is a product of LyondellBasell (Houston, Tex.). Amounts may be as described above. Hifax® CA 7153 S has a density of about 0.9 g/cm³ (23° C.), a melt flow rate of about 20 g/min. (230° C./2.16 kg), and a temperature of melting ($T_m$) of about 143° C., tested in accordance with ISO 11357-3.

The porous polypropylene random copolymer may be employed as a carrier for the organic peroxide, which may be a liquid at ambient conditions, when mixing the organic peroxide with the bimodal high molecular weight high density polyethylene prior to extrusion. The combination of the organic peroxide and porous polypropylene random copolymer may be a powder.

The organic peroxide may be present in an amount ranging from about 5 wt % to about 30 wt %, alternatively in the range of about 5 wt % to about 25 wt %, relative to the total weight of the combination of the peroxide and the porous polypropylene random copolymer. These combinations can be used as masterbatches which are mixed with the bimodal high molecular weight high density polyethylene to be extruded.

EXAMPLES

To facilitate a better understanding of the disclosure, the following examples of embodiments are given. In no way should the following examples be read to limit, or to define, the scope of the appended claims.

The sag resistance of a given HDPE resin can be characterized in the laboratory via the sag value in the melt creep test described above using a rotational parallel plate rheometer with a shear stress of 300 Pa for 5200 seconds at 230° C. Additionally, a rheological polydispersity parameter, ER, defined and measured as described in U.S. Pat. No. 6,171,993, can be used for characterization purposes. ER may be greater than 4.0, alternatively greater than 4.5, and lower than 5.5.

Oxidation Induction Time (OIT) is measured via differential scanning calorimetry (DSC) at 200° C., per ASTM D3895.

In the Examples, samples were prepared for density testing in accordance with ASTM D4703, Procedure C (compression molding plaque). Testing of the samples was according to ASTM D1505 (density determination by gradient column).

Example 1

A bimodal high molecular weight high density polyethylene (L4904; LyondellBasell, Houston, Tex.) was mixed with a powder containing 20 wt % 2,5-dimethyl-2,5-di(tert-butylperoxy)hexane in a porous polypropylene random copolymer (United Initiators, Inc., Elyria, Ohio) and extruded to form a sample of the disclosure. This sample was formed into a 36-inch (91.44 cm) DR11 pipe and compared to a commercially available HDPE resin pipe that was not extruded with organic peroxide. The commercially available HDPE resin had a tensile strength of >3500 psi, an elongation at break of >700%, a flexural modulus of 120,000 psi (2% secant, 16:1 span:depth, 0.5 in/min), and a PENT slow crack growth of >500 hours. A comparison of the properties is shown in Table 1 below. The inventive resin shows better extrudability, as evidenced by lower specific energy, while maintaining minimal pipe wall thickness variation.

TABLE 1

| Property | Resin without peroxide (comparative) | L4904 LS + peroxide (inventive) |
|---|---|---|
| Output | 2600 lb/hr | 2600 lb/hr |
| Specific output | 29.7 lb/hr/rpm | 31.1 lb/hr/rpm |
| Head pressure | 4273 psi | 4343 psi |
| Melt temp. | 222° C. | 218° C. |
| Specific energy | 0.156 hp · hr/lb | 0.145 hp · hr/lb |
| Gels/melt fracture | No | No |
| ID surface | Smooth | Smooth |
| Pipe wall thickness, avg. | 3.46 in. (8.79 cm) | 3.44 in. (8.74 cm) |
| Pipe wall thickness variation | 3.6% | 3.1% |

Example 2

Three extrusion runs were performed at the laboratory scale. In the three runs, the bimodal high molecular weight high density polyethylene (L4904; LyondellBasell, Houston, Tex.) was mixed with a powder containing 20 wt % 2,5-dimethyl-2,5-di(tert-butylperoxy)hexane in a porous polypropylene random copolymer (United Initiators, Inc., Elyria, Ohio) to form an extrusion mixture. The mixture of the HDPE and the powder containing the peroxide was then extruded. In each run, a different amount of 2,5-dimethyl-2,5-di(tert-butylperoxy)hexane was used. Results of testing on pipes formed from the extruded HDPE from these runs, along with two control runs, are summarized in Table 2 below.

TABLE 2

| Run | Peroxide | Density | HLMI | Sag | PENT | Charpy impact |
|---|---|---|---|---|---|---|
| C1* | 0 | 0.9503 g/cm$^3$ | 7.9 dg/min | 50 | 1777 hrs | 9.5 kJ/m$^2$ |
| C2* | 0 | 0.9520 g/cm$^3$ | 7.6 dg/min | 36 | 1089 hrs | 10.0 kJ/m$^2$ |
| 1 | 100 ppm | 0.9506 g/cm$^3$ | 7.1 dg/min | 12 | 630 hrs | 11.4 kJ/m$^2$ |
| 2 | 100 ppm | 0.9503 g/cm$^3$ | 7.2 dg/min | 11 | 956 hrs | 11.2 kJ/m$^2$ |
| 3 | 80 ppm | 0.9508 g/cm$^3$ | 7.2 dg/min | 13 | 758 hrs | 11.2 kJ/m$^2$ |

*Comparative run.

Example 3

The extrusion runs in this Example were performed as in Example 2, except that in Runs G-J, the powder containing 2,5-dimethyl-2,5-di(tert-butylperoxy)hexane in a porous polypropylene random copolymer had 5 wt % 2,5-dimethyl-2,5-di(tert-butylperoxy)hexane. In this Example, the Full Notch Creep Test (FNCT) was determined by ISO 16770.

Results of testing on pipes formed from the extruded HDPE from these runs are summarized in Tables 3A and 3B below.

TABLE 3A

| Run | Peroxide | Density | HLMI | Sag | PENT (avg.) | Charpy impact | FNCT† |
|---|---|---|---|---|---|---|---|
| C3* | 0 | 0.9490 g/cm$^3$ | 7.7 dg/min | 44.0 | | 10.5 kJ/m$^2$ | 131 hrs |
| C4* | 0 | 0.9489 g/cm$^3$ | 9.4 dg/min | 47.0 | 5160 hrs | 10.6 kJ/m$^2$ | 121 hrs |
| A | 60 ppm | 0.9489 g/cm$^3$ | 9.5 dg/min | 15.4 | 2600 hrs | 11.3 kJ/m$^2$ | 27 hrs |
| B | 60 ppm | 0.9489 g/cm$^3$ | 8.3 dg/min | 14.3 | 3900 hrs | 11.3 kJ/m$^2$ | 29 hrs |
| C | 45 ppm | 0.9485 g/cm$^3$ | 7.4 dg/min | 18.8 | 2360 hrs | 11.2 kJ/m$^2$ | 31 hrs |
| D | 30 ppm | 0.9485 g/cm$^3$ | 7.9 dg/min | 23.1 | 4550 hrs | 10.9 kJ/m$^2$ | 35 hrs |
| C5* | 0 | 0.9468 g/cm$^3$ | 9.1 dg/min | 49.0 | >6200 hrs | 10.5 kJ/m$^2$ | 117 hrs |
| E | 60 ppm | 0.9469 g/cm$^3$ | 8.1 dg/min | 15.7 | >6200 hrs | 11.5 kJ/m$^2$ | 64 hrs |
| F | 30 ppm | 0.9466 g/cm$^3$ | 8.4 dg/min | 25.8 | >6200 hrs | 11.1 kJ/m$^2$ | 80 hrs |
| G | 52 ppm | 0.9471 g/cm$^3$ | 7.9 dg/min | 13.8 | 5490 hrs | 11.7 kJ/m$^2$ | 47 hrs |
| H | 45 ppm | 0.9470 g/cm$^3$ | 8.1 dg/min | 16.2 | 6020 hrs | 11.2 kJ/m$^2$ | 62 hrs |
| I | 30 ppm | 0.9470 g/cm$^3$ | 8.4 dg/min | 23.4 | >6200 hrs | 11.1 kJ/m$^2$ | 83 hrs |
| J | 15 ppm | 0.9469 g/cm$^3$ | 9.0 dg/min | 30.0 | >6200 hrs | 10.7 kJ/m$^2$ | 76 hrs |

*Comparative run.
†FNCT = Full Notch Creep Test: measured at 5 MPa and 90° C. using NM-5 as the surfactant.

TABLE 3B

| Run | C$_4$, by NMR | Flex modulus, 1% (avg.) | OIT | MI5 | ER |
|---|---|---|---|---|---|
| C3* | 1.39 wt % | 155800 | 115 min. | 0.17 | 2.9 |
| C4* | 1.26 wt % | 157800 | 111 min. | 0.17 | 2.8 |
| A | 1.43 wt % | 153700 | 115 min. | 0.15 | 4.9 |
| B | 1.47 wt % | 153100 | 113 min. | 0.14 | 4.9 |
| C | 1.28 wt % | 156300 | 116 min. | 0.14 | 4.5 |
| D | 1.44 wt % | 157900 | 152 min. | 0.16 | 4.1 |
| C5* | 1.78 wt % | 148700 | 127 min. | 0.19 | 2.8 |
| E | 1.93 wt % | 149100 | 109 min. | 0.14 | 4.8 |
| F | 1.82 wt % | 145800 | 120 min. | 0.18 | 4.3 |
| G | 1.73 wt % | 143000 | 81 min. | 0.16 | 5.2 |
| H | 1.68 wt % | 145900 | 94 min. | 0.14 | 4.9 |
| I | 1.73 wt % | 145600 | 101 min. | 0.17 | 4.4 |
| J | 1.94 wt % | 146100 | 102 min. | 0.18 | 3.7 |

*Comparative run.

Example 4

Some of the materials of Example 2 were subjected to hoop stress tests, in which a sample of each material was subjected to a (hoop stress) pressure, and the time to failure was measured. Conditions and results are summarized in Table 4.

TABLE 4

| Run | T | Hoop stress | Hoop stress | Time to failure |
|---|---|---|---|---|
| C3* | 23° C. | 1850 psi | 1.276 × 10$^7$ Pa | 36 hours |
| A/B | 23° C. | 1850 psi | 1.276 × 10$^7$ Pa | 109 hours |
| C5* | 23° C. | 1850 psi | 1.276 × 10$^7$ Pa | 40 hours |
| E | 23° C. | 1850 psi | 1.276 × 10$^7$ Pa | 33 hours |
| C3* | 23° C. | 1825 psi | 1.258 × 10$^7$ Pa | 52 hours |
| A/B | 23° C. | 1825 psi | 1.258 × 10$^7$ Pa | 186 hours |
| C5* | 23° C. | 1825 psi | 1.258 × 10$^7$ Pa | 35 hours |
| E | 23° C. | 1825 psi | 1.258 × 10$^7$ Pa | 41 hours |
| C3* | 23° C. | 1800 psi | 1.241 × 10$^7$ Pa | 93 hours |
| A/B | 23° C. | 1800 psi | 1.241 × 10$^7$ Pa | 268 hours |
| C5* | 23° C. | 1800 psi | 1.241 × 10$^7$ Pa | 52 hours |
| E | 23° C. | 1800 psi | 1.241 × 10$^7$ Pa | 87 hours |
| C5* | 23° C. | 1775 psi | 1.224 × 10$^7$ Pa | 56 hours |
| E | 23° C. | 1775 psi | 1.224 × 10$^7$ Pa | 146 hours |
| C3* | 23° C. | 1750 psi | 1.206 × 10$^7$ Pa | 179 hours |
| A/B | 23° C. | 1750 psi | 1.206 × 10$^7$ Pa | 779 hours |
| C5* | 23° C. | 1750 psi | 1.206 × 10$^7$ Pa | 84 hours |
| E | 23° C. | 1750 psi | 1.206 × 10$^7$ Pa | 170 hours |
| C5* | 23° C. | 1725 psi | 1.189 × 10$^7$ Pa | 131 hours |
| E | 23° C. | 1725 psi | 1.189 × 10$^7$ Pa | 484 hours |
| C5* | 23° C. | 1700 psi | 1.172 × 10$^7$ Pa | 225 hours |

TABLE 4-continued

| Run | T | Hoop stress | Hoop stress | Time to failure | |
|---|---|---|---|---|---|
| E | 23° C. | 1700 psi | 1.172 × 10⁷ Pa | 745 | hours |
| C5* | 23° C. | 1675 psi | 1.155 × 10⁷ Pa | 533 | hours |
| E | 23° C. | 1675 psi | 1.155 × 10⁷ Pa | 1349 | hours |
| C5* | 23° C. | 1650 psi | 1.138 × 10⁷ Pa | 685 | hours |
| E | 23° C. | 1650 psi | 1.138 × 10⁷ Pa | >2769 | hours |

*Comparative run.

Further embodiments of the disclosure include, without limitation:

A) A pipe comprising bimodal high molecular weight high density polyethylene which has been extruded within the range of about 30 ppm to about 200 ppm of one or more organic peroxides having a half-life of 1 hour at a temperature in the range of about 125° C. to about 145° C., the bimodal high molecular weight high density polyethylene having a density in the range of about 0.9460 g/cm³ to about 0.9520 g/cm³, and the pipe having a long-term hydrostatic strength $t_F/t_R$ ratio of about 1.5 or greater when determined at 23° C. and 12 MPa and/or at 23° C. and 11.5 MPa, where $t_F$ is the time-to-failure of the pipe and $t_R$ is the time-to-failure of a comparative bimodal high molecular weight high density polyethylene resin which has not been extruded with an organic peroxide, wherein the long-term hydrostatic strength $t_F/t_R$ ratio is determined by measuring the time-to-failure of the pipe at 12 MPa or at 11.5 MPa, and calculating the $t_F/t_R$ ratio, using $$t_R=100 \text{ hours} \times [1+(\text{density}-0.947) \times 1340] \text{ for determinations at 12 MPa, and}$$

$$t_R=560 \text{ hours} \times [1+(\text{density}-0.947) \times 1340] \text{ for determinations at 11.5 MPa.}$$

B) The pipe as in A) wherein the organic peroxide is in an amount in the range of about 40 ppm to about 150 ppm in the bimodal high density polyethylene.

C) The pipe as in A) wherein the bimodal high density polyethylene also contains a porous polypropylene random copolymer.

D). The pipe as in A) wherein the long-term hydrostatic strength $t_F/t_R$ ratio is about 2.0 or greater when determined at 23° C. and 12 MPa and/or at 23° C. and 11.5 MPa.

E) The pipe as in A) which has one or more of the following properties:
a sag value of about 20 or less;
a PENT result of about 500 hours or more; and
a Charpy impact energy of about 10 kJ/m² or more.

F) The pipe as in A) which has one or more of the following properties:
a density in the range of about 0.9470 g/cm³ to about 0.9510 g/cm³;
a sag value of about 15 or less;
a PENT result of about 1000 hours or more; and
a Charpy impact energy of about 11 kJ/m² or more.

G) The pipe as in E) which has two or more of the properties.

H) The pipe as in F) which has two or more of the properties.

I) The pipe as in E) wherein the organic peroxide is in an amount in the range of about 40 ppm to about 150 ppm in the bimodal high density polyethylene, wherein the bimodal high density polyethylene also contains a polypropylene random copolymer, and wherein the long-term hydrostatic strength $t_F/t_R$ ratio is about 2.0 or greater when determined at 23° C. and 12 MPa and/or at 23° C. and 11.5 MPa.

J) The pipe as in F) wherein the organic peroxide is in an amount in the range of about 45 ppm to about 125 ppm in the bimodal high density polyethylene, wherein the bimodal high density polyethylene also contains a polypropylene random copolymer, and wherein the long-term hydrostatic strength $t_F/t_R$ ratio is about 2.0 or greater when determined at 23° C. and 12 MPa and/or at 23° C. and 11.5 MPa.

K) The pipe as in any of A)-J) wherein the organic peroxide has
a half-life of 1 hour at a temperature in the range of about 130° C. to about 140° C.;
a half-life of 0.1 hour at a temperature in the range of about 145° C. to 165° C.; and/or
a molecular weight in the range of about 175 g/mol to about 375 g/mol.

L) The pipe as in any of A)-J) wherein the organic peroxide is dicumyl peroxide, di(tert-butylperoxyisopropyl)benzene(s), 2,5-dimethyl-2,5-di(tert-butylperoxy)hexane, tert-butyl cumyl peroxide, and/or 2,5-dimethyl-2,5-di(tert-butylperoxy)hexyne.

M) The pipe as in any of A)-J) wherein the organic peroxide is 2,5-dimethyl-2,5-di(tert-butylperoxy)hexane.

N) A method comprising
extruding bimodal high molecular weight high density polyethylene within the range of about 30 ppm to about 200 ppm of one or more organic peroxides having a half-life of 1 hour at a temperature in the range of about 125° C. to about 145° C., to form extruded bimodal high molecular weight high density polyethylene, and
forming at least a portion of a pipe from at least a portion of the extruded bimodal high molecular weight high density polyethylene,
wherein the portion of the pipe formed has a long-term hydrostatic strength $t_F/t_R$ ratio of about 1.5 or greater when determined at 23° C. and 12 MPa and/or at 23° C. and 11.5 MPa, and a density in the range of about 0.9460 g/cm³ to about 0.9520 g/cm³, and wherein the long-term hydrostatic strength $t_F/t_R$ ratio is determined by measuring the time-to-failure of the pipe at 12 MPa or at 11.5 MPa, and calculating the $t_F/t_R$ ratio, using $$t_R=100 \text{ hours} \times [1+(\text{density}-0.947) \times 1340] \text{ for determinations at 12 MPa, and}$$

$$t_R=560 \text{ hours} \times [1+(\text{density}-0.947) \times 1340] \text{ for determinations at 11.5 MPa.}$$

O) The method as in N) wherein the organic peroxide is in an amount in the range of about 40 ppm to about 150 ppm in the bimodal high density polyethylene.

P) The method as in N) wherein a polypropylene random copolymer is employed as a carrier for the organic peroxide.

Q) The method as in N) wherein the long-term hydrostatic strength $t_F/t_R$ ratio is about 2.0 or greater when determined at 23° C. and 12 MPa and/or at 23° C. and 11.5 MPa.

R) The method as in N) wherein the portion of the pipe formed has a density in the range of about 0.9470 g/cm³ to about 0.9510 g/cm³.

S) The method as in N) wherein the bimodal high density polyethylene has a high load melt index in the range of about 5 to about 10.

T) The method as in N) wherein the organic peroxide is in an amount in the range of about 45 ppm to about 125 ppm in the bimodal high density polyethylene, wherein a polypropylene random copolymer is employed as a carrier for the organic peroxide, wherein the long-term hydrostatic strength $t_F/t_R$ ratio is about 2.0 or greater when determined at 23° C. and 12 MPa and/or at 23° C. and 11.5 MPa, and wherein the portion of the pipe formed has a density in the range of about 0.9470 g/cm³ to about 0.9510 g/cm³.

U) The method as in any of N)-T) wherein the organic peroxide has
    a half-life of 1 hour at a temperature in the range of about 130° C. to about 140° C.;
    a half-life of 0.1 hour at a temperature in the range of about 145° C. to 165° C.; and/or
    a molecular weight in the range of about 175 g/mol to about 375 g/mol.

V) The method as in any of N)-T) wherein the organic peroxide is dicumyl peroxide, di(tert-butylperoxyisopropyl)benzene(s), 2,5-dimethyl-2,5-di(tert-butylperoxy)hexane, tert-butyl cumyl peroxide, and/or 2,5-dimethyl-2,5-di(tert-butylperoxy)hexyne.

W) The method as in any of N)-T) wherein the organic peroxide is 2,5-dimethyl-2,5-di(tert-butylperoxy)hexane.

While the foregoing is directed to embodiments of the present disclosure, further embodiments may be devised without departing from the scope of the present disclosure and the appended claims.

What is claimed is:

1. An extruded pipe comprising: (1) a bimodal high molecular weight high density polyethylene having a density ranging from about 0.9460 g/cm³ to about 0.9520 g/cm³, and (2) a polypropylene random copolymer containing one or more organic peroxides,
    wherein the pipe was extruded in the presence of about 30 ppm to about 200 ppm of one or more organic peroxides,
    wherein the one or more organic peroxides has a half-life of 1 hour at a temperature in the range of about 125° C. to about 145° C., and
    the extruded pipe has a long-term hydrostatic strength tF/tR ratio of about 1.5 or greater when determined at 23° C. and 12 MPa and/or at 23° C. and 11.5 MPa, where tF is the time-to-failure of the pipe and tR is the time-to-failure of a comparative pipe which has not been extruded with organic peroxide.

2. The extruded pipe of claim 1, wherein the organic peroxide is present in an amount ranging from about 40 ppm to about 150 ppm.

3. The extruded pipe of claim 1, wherein the long-term hydrostatic strength tF/tR ratio is about 2.0 or greater when determined at 23° C. and 12 MPa and/or at 23° C. and 11.5 MPa.

4. The extruded pipe of claim 1, wherein the organic peroxide comprises:
    a half-life of 1 hour at a temperature in the range of about 130° C. to about 140° C.;
    a half-life of 0.1 hour at a temperature in the range of about 145° C. to 165° C.; and
    a molecular weight in the range of about 175 g/mol to about 375 g/mol.

5. The extruded pipe of claim 1, wherein the organic peroxide is selected from the group consisting of dicumyl peroxide, di(tert-butylperoxyisopropyl)benzene(s), 2,5-dimethyl-2,5-di(tert-butylperoxy)hexane, tert-butyl cumyl peroxide, and 2,5-dimethyl-2,5-di(tert-butylperoxy)hexyne.

6. The extruded pipe of claim 1, wherein the long-term hydrostatic strength tF/tR ratio is determined by measuring the time-to-failure of the pipe at 12 MPa or at 11.5 MPa, and calculating the tF/tR ratio, using $$tR = 100 \text{ hours} \times [1+(\text{density}-0.947) \times 1340] \text{ for determinations at 12 MPa, and}$$

$$tR = 560 \text{ hours} \times [1+(\text{density}-0.947) \times 1340] \text{ for determinations at 11.5 MPa.}$$

7. The extruded pipe of claim 1, which has one or more of the following properties:
    a sag value of about 20 or less;
    a PENT result of about 500 hours or more; and
    a Charpy impact energy of about 10 kJ/m² or more.

8. The extruded pipe of claim 7, which has one or more of the following properties:
    a density in the range of about 0.9470 g/cm³ to about 0.9510 g/cm³;
    a sag value of about 15 or less;
    a PENT result of about 1000 hours or more; and
    a Charpy impact energy of about 11 kJ/m² or more.

9. The extruded pipe of claim 8, further comprising two or more of the properties, wherein the organic peroxide is present in an amount ranging from about 45 ppm to about 125 ppm in the bimodal high density polyethylene, and wherein the long-term hydrostatic strength tF/tR ratio is about 2.0 or greater when determined at 23° C. and 12 MPa and/or at 23° C. and 11.5 MPa.

10. The extruded pipe of claim 7, further comprising two or more of the properties, wherein the organic peroxide is present in an amount ranging from about 40 ppm to about 150 ppm in the bimodal high density polyethylene, and wherein the long-term hydrostatic strength tF/tR ratio is about 2.0 or greater when determined at 23° C. and 12 MPa and/or at 23° C. and 11.5 MPa.

* * * * *